(12) United States Patent
Aleisa et al.

(10) Patent No.: US 9,157,198 B1
(45) Date of Patent: Oct. 13, 2015

(54) ASPHALT COMPOSITION AND METHOD FOR TESTING, SELECTING AND ADDING OIL CONTAMINATED SOIL TO ASPHALT FOR ROAD CONSTRUCTION

(71) Applicants: Esra Eisa Abdulwahab Aleisa, Kuwait (KW); Lubna Abdulaziz Khaled Aljenai, KW (KW); Dalal Taleb Hussain Ali Jeraq, KW (KW)

(72) Inventors: Esra Eisa Abdulwahab Aleisa, Kuwait (KW); Lubna Abdulaziz Khaled Aljenai, KW (KW); Dalal Taleb Hussain Ali Jeraq, KW (KW)

( * ) Notice: Subject to any disclaimer, the term of this patent is extended or adjusted under 35 U.S.C. 154(b) by 0 days.

(21) Appl. No.: 14/445,429

(22) Filed: Jul. 29, 2014

(51) Int. Cl.
*C10C 3/00* (2006.01)
*E01C 21/00* (2006.01)
*B09B 3/00* (2006.01)
*C08L 95/00* (2006.01)

(52) U.S. Cl.
CPC . *E01C 21/00* (2013.01); *B09B 3/00* (2013.01); *C08L 95/00* (2013.01); *C08L 2555/52* (2013.01)

(58) Field of Classification Search
CPC .......................................... C10C 3/00
See application file for complete search history.

(56) References Cited

U.S. PATENT DOCUMENTS

| | | |
|---|---|---|
| 5,236,497 A | 8/1993 | Grzybowski |
| 5,272,833 A | 12/1993 | Prill et al. |
| 5,312,246 A | 5/1994 | Brock |
| 5,344,485 A * | 9/1994 | Glynn, Jr. ................... 106/281.1 |
| 5,378,059 A * | 1/1995 | Brock ................................ 366/7 |
| 5,453,133 A * | 9/1995 | Sparks et al. ................. 134/25.1 |
| 5,507,953 A * | 4/1996 | Machlitt et al. ............... 210/634 |
| 5,690,811 A * | 11/1997 | Davis et al. .................... 208/428 |
| 5,944,034 A | 8/1999 | McRae et al. |
| 7,118,624 B2 | 10/2006 | Polston |
| 7,232,482 B2 * | 6/2007 | Polston ......................... 106/668 |
| 7,276,114 B2 | 10/2007 | Polston |
| 7,371,277 B2 | 5/2008 | Polston |

OTHER PUBLICATIONS

R. C. Czarnecki, Making Use of Contaminated Soil, 58 Civ. Eng. 72-74 (1988).*
Ali, M. A., Marshall Method of Asphalt-Concrete Mix Design, Kuwait: Kuwait University, Civil Engineering Department, 2003.
Das, B. M., Specific Gravity of Soil Solids, Soil Mechanics Laboratory Manual (6th ed.), New York: Oxford University Press, Inc., 2002.
Montgomery, D.C., Design and Analysis of Experiments (7th ed.), United States of America: Arizona State University, 2005.
Omar, S. A. S. et al., Critical Assessment of the Environmental Consequences of the Invasion of Kuwait, the Gulf War, and the Aftermath, Kuwait, 2008.

* cited by examiner

*Primary Examiner* — Randy Boyer
(74) *Attorney, Agent, or Firm* — Hauptman Ham, LLP

(57) ABSTRACT

A method for recycling oil contaminated soil is disclosed as well as a method for testing and selecting soil and adding the oil contaminated soil to the asphalt used in road construction. The oil contaminated soil has a saturation of oil between about 2% and 4%. The demoisturizing of soil was done prior to conducting a sieve analysis and obtained the percentage of oil contamination in the soil. After testing, the oil contaminated soil is used as a replacement for up to 50% of the mineral aggregates used in asphalt concrete for road construction.

10 Claims, 5 Drawing Sheets

ASPHALT COMPOSITION AND METHOD FOR TESTING, SELECTING AND ADDING OIL CONTAMINATED SOIL TO ASPHALT FOR ROAD CONSTRUCTION

FIELD OF THE INVENTION

This invention relates to an asphalt composition and to a method for testing, selecting and adding oil contaminated soil to asphalt for use in road construction and more particularly to a method for recycling oil contaminated soil.

BACKGROUND OF THE INVENTION

Oil-contaminated soil is found in great amounts in Kuwait as a result of the Iraqi invasion of Kuwait. Beginning on Feb. 17, 1991, the Iraqi troops ignited 798 oil wells. The oil wells discharged enormous quantities of oil onto the terrestrial environment which flowed through natural slopes and damaged around 114 $km^2$ (44 square miles) of Kuwait landscape.

Oil spills, raptured pipelines and the like have produced oil contaminated soil in other parts of the world. While few of any such contaminations approach the enormous volume in Kuwait, it is presently believed that there is a need to recycle oil contaminated soil in many countries.

In the United States, for example, laws such as the super fund require the disclosure of the presence of said contamination to potential buyers of industrial and/or commercial property. In the United States there are several approaches for treating soil that is contaminated with hydrocarbons. For example, the contaminated soil can be transported to a landfill, but this does not remove continuing liability.

Other approaches for treating hydrocarbon contaminated soil are known but most if not all involve one or more problems as for example polluted air and/or expense.

Notwithstanding the above, it is presently believed that there is a need and a potential market for a more economical solution for recycling oil contaminated soil. Accordingly, there should be a need and a potential market for the present invention wherein oil contaminated soil is used as a replacement for up to 50% of the mineral aggregates in asphalt compositions used for road construction.

BRIEF SUMMARY OF THE INVENTION

In essence, the present invention contemplates a method for testing, selecting and adding oil contaminated soil to asphalt for use in road construction. The method comprises and/or consists of the following steps.

a. providing a mass of oil contaminated soil or more preferably sand having a saturation of oil ranging between 2% and 4%, selecting a sample of the soil, demoisturizing the selected sample and cleaning the sample. In a preferred embodiment of the invention, the sample is demoisturized by heating to between 175° C. to 190° C. for about 24 hours and cleaned by treating the sample with hot toluene at a temperature of about 40° C. for about 30 minutes. This cleaned and demoisturized sample was used only for the first three tests (S.G., saturation level and sieve analysis), not included in the asphalt mixture;

b. following the aforementioned step a. the sample is placed in a shaker to determine that the particle sizes are between about 4.75 mm and 75 μm;

c. further testing was conducted and showed that the oil contaminated soil had a specific gravity of about 2.4 and 2.28. VMA is one of the factors found when the marshal samples are analyzed along with the stability and flow.

The second embodiment of the invention contemplates an asphalt composition containing oil contaminated soil and/or sand.

The third embodiment of the invention comprises a method of recycling oil contaminated soil. The method comprises and/or consists of the following steps.

The invention will now be described in connection with the accompanying figures wherein like numerals have been used to illustrate like parts.

DESCRIPTION OF THE PREFERRED EMBODIMENTS OF THE INVENTION

Figure 1:
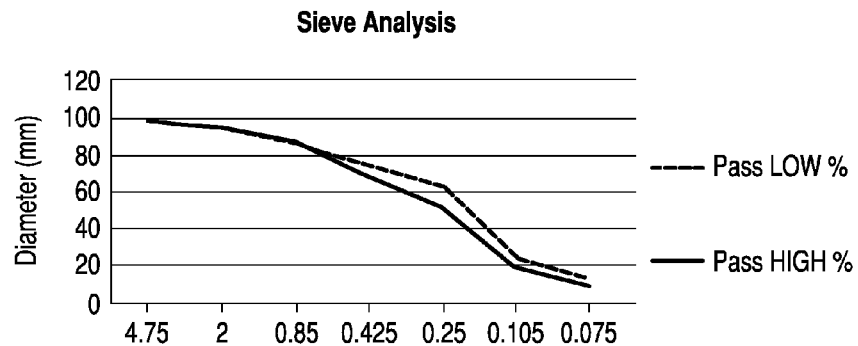
FIG. 1 is a graphical representation of a sieve analysis of the oil contaminated soil selected from the Bahra site in Kuwait.

The Project Scope:
1. Project Objective:
To test and analyze the final samples for stability, air voids and VMA, and determine its abilities dependently.
2. Deliverables:
a. The test prototypes.
b. The results behind these prototypes.
3. Milestones:
a. Finishing the first three tests (sieve analysis, extraction, specific gravity).
b. Preparing the Marshal test samples.
c. Analysis done of the samples and calculating the final output.
4. Technical requirements:
standards for responses:
stability: min 6 kiloNewton (kN).
Flow, 0.25 mm: min 8, max 16
VMA: min 15
5. Tools and equipment
a. Petrolluem lab "Extraction"
hot toluene extraction method
balance
b. transportation lab "preparing marshal test samples"
mold assembly, sample extractor, compaction pedestal, hammer, breaking head, loading machine, flow meter, water bath and thermometer
c. soil lab "specific gravity:
pycnometer
balance
distilled water
d. Soil lab "sieve analysis"
over dry soil
balance
stack of sieves The following experiments test the ability of using the oil contaminated soil (sand) in creating an asphalt concrete layer within established standards by considering the oil contaminated soil effect on soil stability. Factors considered are the saturation percentage of oil in oil contaminated soil ranging between 2-4%, and the percentage of contaminated soil present in the sand mixture with the ranges of 30, 40, and 50%. Main response variables are the mixture stability and the amount of flow, and percentage of voids in mineral aggregates (VMA).

II. Samples

This is a fractional factorial experiment with two replications. Two factors are involved, one with two levels and the other with three levels, twelve trials were conducted in random order. Each trial consists of four samples of different bitumen levels (4%-5.5%) as the Marshall method requires.

III. Lab Analysis

A. Extraction

Soil samples were demoisturized and cleaned with continuous hot toluene extraction method. The Toluene soluble hydrocarbon is calculated as weight fraction. This is a preparation step to conduct the sieve analysis.

B. Sieve Analysis

Sieve analysis is the method used to determine the grain size distribution needed in designing marshal test trials.

The process of implementing the analysis begins with the collection of a representative oven dry soil sample, then determining the mass of the sample accurately to 0.1 g, afterwards pouring the soil samples into the stack of sieves which are arranged based on their sizes, and finally running the stack of sieves through a sieve shaker for about 10-15 minutes. Weighing the amount of soil retained on each sieve and the bottom pan [2].

The distribution represents poorly graded sand grains. Therefore, the wearing coarse layer is the most suitable layer based on the marshal design's standards of the aggregates size.

C. Specific Gravity

Specific gravity (SG) of the samples was found using the pcynometer. First 10 g of a dry soil sample was placed in a clean and dry pycnometer and weighting it weight of 10 g dry soil placed in the pycnometer (Wps), then distilled water is added to fill about half to three-fourth of the pycnometer at this point weight of the 10 g dry soil added to distilled water in the pycnometer ($W_B$) is calculated.

The pycnometer is empty and cleaned. Then filling it with distilled water only (to the mark). Cleaning the exterior surface of the pycnometer comes next, and finally determining the weight of the pycnometer and distilled water $W_A$ [2].

The specific gravity ("SG") equation:

$$SG = \frac{W_{ps}}{W_{ps} + (W_A + W_B)} \quad (1)$$

Results are 2.4 for low contamination and 2.28 for high contamination of oil.

TABLE I

TABLE DESIGN TAKEN INTO CONSIDERATION IN MARSHALL TEST

| S/L No. | Sieve size (passing) | Range % (pass) | Our Selection | % Retained | Sample Wt, (gm.) | | |
|---|---|---|---|---|---|---|---|
| | | | | | | (30% of OCS) | (40% of OCS) | (50% of OCS) |
| 0 | 3/4" | 100 | 100 | 0 | 0 | | |
| 1 | 1/2" | 66-95 | 80 | 20 | 240 | | |
| 2 | 3/8" | 54-88 | 70 | 10 | 120 | | |
| 3 | no.4 | 37-70 | 55 | 15 | 180 | | |
| 4 | no.8 | 26-52 | 40 | 15 | 126 | 108 | 90 |
| 5 | no.16 | 18-40 | 30 | 10 | 84 | 72 | 60 |
| 6 | no.30 | 13-30 | 20 | 10 | 84 | 72 | 60 |
| 7 | no.50 | 8-23 | 15 | 5 | 42 | 36 | 30 |
| 8 | no.100 | 6-16 | 10 | 5 | 42 | 36 | 30 |
| 9 | no.200 | 4-10 | 5 | 5 | 42 | 36 | 30 |
| 10 | Filler | 0 | 0 | 5 | 42 | 36 | 30 |
| | Weight of the oil-contaminated soil | | | | 198 | 264 | 330 |

D. Preparation of the Marshall Test

Table 1 is the Design table which summarizes the quantities that have been selected from each aggregate size of the oil contaminated soil.

A 1200 gm sample that contains coarse, fine, and filler aggregates with oil contaminated soil was prepared by taking the midpoint of each range of the aggregate as shown in Table 1. A 30%, 40% and 50% of grain size from 4.75 mm to <75 μm was replaced with the high and low oil contaminated soil. The choice of the sieve size was based on the result of the sieve analysis of the oil contaminated soil. The table represents the design of each trail that consists of 4 samples, each sample varies with the bitumen level.

Equipments used are: 175-190° C. oven, round mold with a diameter of 10 cm and 7.5 cm height consisting of a base metal and collar extension, compaction pedestal, sample extractor and a hammer [3].

E. The Marshal Test

The samples were subjected to plastic deformation by using Marshall stability testing machine to get the stability and flow values.

Certain calculations and analysis were further conducted to get the voids in mineral aggregates (VMA) and, hence the optimum binder content of each trial.

IV. Final Result

The final results of the optimum binder content are shown in Table II. While the required standards are shown in Table III.

TABLE II

THE RESPONSES DATA SUMMARY

| Sample ID | Stability KN | Flow 0.25 mm | VMA |
|---|---|---|---|
| H30 | 5.6 | 13 | 9 |
| H40 | 7.4 | 25 | 8.5 |
| H50 | 6.3 | 10.5 | 7.5 |
| L30 | 8.2 | 11.8 | 9.5 |
| L40 | 6 | 30 | 10.4 |
| L50 | 7.37 | 8.84 | 9.2 |
| H30 | 8.25 | 22 | 8.7 |
| H40 | 5.7 | 13.6 | 8.6 |
| H50 | 5.86 | 11.92 | 8 |
| L30 | 7.8 | 14 | 10.1 |
| L40 | 7.84 | 15 | 10 |
| L50 | 8.73 | 10.4 | 9 |

TABLE III

STANDARDS FOR RESPONSE

| Description | Min | Max |
|---|---|---|
| Stability, KN | 6 | — |
| Flow, 0.25 mm | 8 | 16 |
| VMA | 15 | — |

V. Statistical Analysis

A. The Hypothesis Test

Hypothesis tests are used to examine if difference in treatment combination of oil saturation percentage, the soil contaminated percentage and their interaction effect on soil properties. It is good to point that the conclusion is a statement of the population distribution not only of the sample considered in this experiment.

$$H_0: \tau_1 = \tau_2 = 0$$

$$H_1: \text{at least one } \tau_i \neq 0; i=1,2,3 \quad (2)$$

Where, $\tau_i$, is the effect of the saturation percentage level i.

$$H_0: \beta_1 = \beta_2 = \beta_3 = 0$$

$$H_1: \text{at least one } \beta_j \neq 0; j=1,2,3 \quad (3)$$

Where, $\beta_j$ is the effect of the contaminated soil percentage level j.

$$H_0: (\tau\beta)_{ij} = 0 \text{ for all } i,j$$

$$H_1: \text{at least one } (\tau\beta)_{ij} \neq 0 \quad (4)$$

Where, $(\tau\beta)_{ij}$ is interaction effect between the two factors.

B. Experiment Assumptions

The following assumptions were investigated for the residuals

It is a complete randomized experiment.
The data are independent.
The errors follow a Normal Distribution with mean 0 and share the same variance $N(0, \sigma2)$.

C. Analysis of Variance

Minitab software version 14 was used to conduct analysis of variance (ANOVA).

TABLE IV

ANOVA TABLE FOR STABILITY

| Source | DF | Seq SS | Addj SS | AdjMS | F | P |
|---|---|---|---|---|---|---|
| % of oil | 1 | 3.887 | 3.887 | 3.887 | 3.01 | 0.133 |
| % of soil | 2 | 1.062 | 1.062 | 0.531 | 0.41 | 0.680 |
| % of oil * % of soil | 2 | 1.286 | 1.286 | 0.643 | 0.50 | 0.631 |
| Error | 6 | 7.751 | 7.751 | 1.292 | | |
| Total | 11 | 13.986 | | | | |

From Table IV, the P-value of the stability is greater than $\alpha=0.05$, then we fail to reject the null hypothesis which indicates that the stability mean values do not change at different oil saturation percentages or contaminated soil percentages. This means using either high oil saturation values or low does not influence the stability in creating asphalt concrete and the same applies on the contaminated soil percentages. Furthermore, increasing the contaminated soil percentages up to 50% will not affect the stability of the asphalt concrete.

TABLE V

ANOVA TABLE FOR FLOW

| Source | DF | Seq SS | Addj SS | AdjMS | F | P |
|---|---|---|---|---|---|---|
| % of oil | 1 | 2.98 | 2.98 | 2.98 | 0.08 | 0.786 |
| % of soil | 2 | 220.43 | 220.43 | 110.21 | 2.97 | 0.127 |
| % of oil * % of soil | 2 | 30.95 | 30.95 | 15.47 | 0.42 | 0.677 |
| Error | 6 | 222.63 | 222.63 | 37.10 | | |
| Total | 11 | 476.98 | | | | |

Regarding the flow as shown in Table V, the P-value is greater than $\alpha=0.05$, thus, we do not reject the null hypothesis, which indicates that the flow mean values do not change at different oil saturation percentages or contaminated soil percentages and the same stability conclusion applies here.

TABLE VI

ANOVA TABLE FOR VMA

| Source | DF | Seq SS | Addj SS | AdjMS | F | P |
|---|---|---|---|---|---|---|
| % of oil | 1 | 5.2008 | 5.2008 | 5.2008 | 68.58 | 0 |
| % of soil | 2 | 2.2867 | 2.2867 | 1.1433 | 15.08 | .005 |
| % of oil * % of soil | 2 | 0.2467 | 0.2467 | 0.1233 | 1.63 | .273 |
| Error | 6 | 0.4550 | 0.4550 | 0.0758 | | |
| Total | 11 | 8.1892 | | | | |

As for the VMA in Table VI, since P-value is lower than $\alpha=0.05$, then the null hypothesis is rejected. Therefore there is evidence to say that changing the level of the percentage of oil and percentage of soil affect the VMA values.

The P-value of the interaction in all properties was found to be greater than $\alpha=0.05$. Then, we fail to reject and this shows that the interaction effect of oil saturation percentage and the contaminated soil percentage is insignificant on the stability, flow, and VMA.

D. The Main Effect

The main effect shows the oil saturation values and the effect of the contaminated soil values on the samples properties separately.

Figure 2:
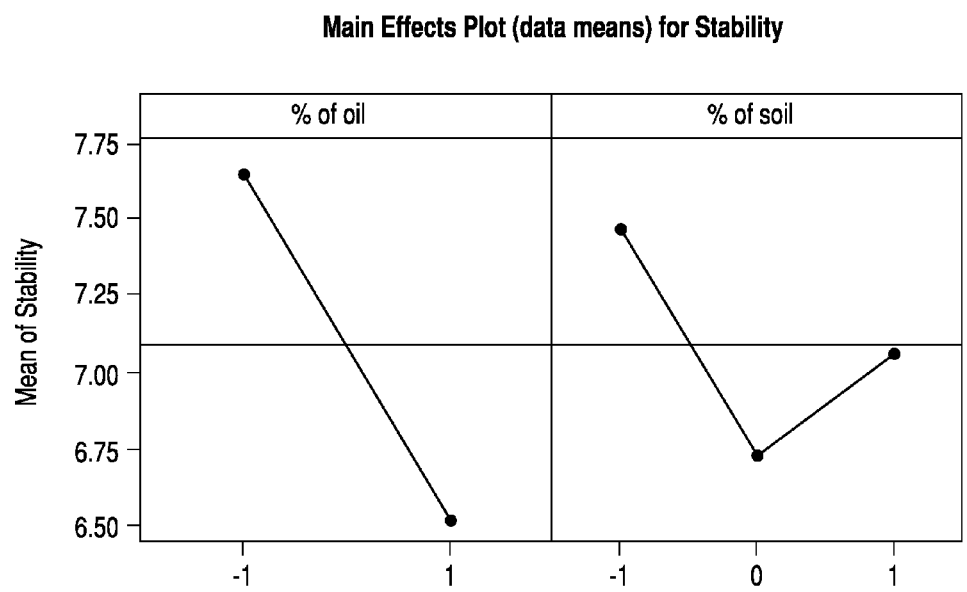
FIG. 2 is a graphical representation of the analysis of variance ("ANOVA") main effect plot for stability.

The main effects plot stability in FIG. 2, and shows that increasing the percentage of oil from low to high decreases the stability. In seeking high stability, low saturation of oil is better. It also shows that moving the contaminated soil percentage from 30% to 40% decreases the stability and it increases when moving from 40% to 50%. The max stability was found with both low oil % and 30% soil.

Figure 3:
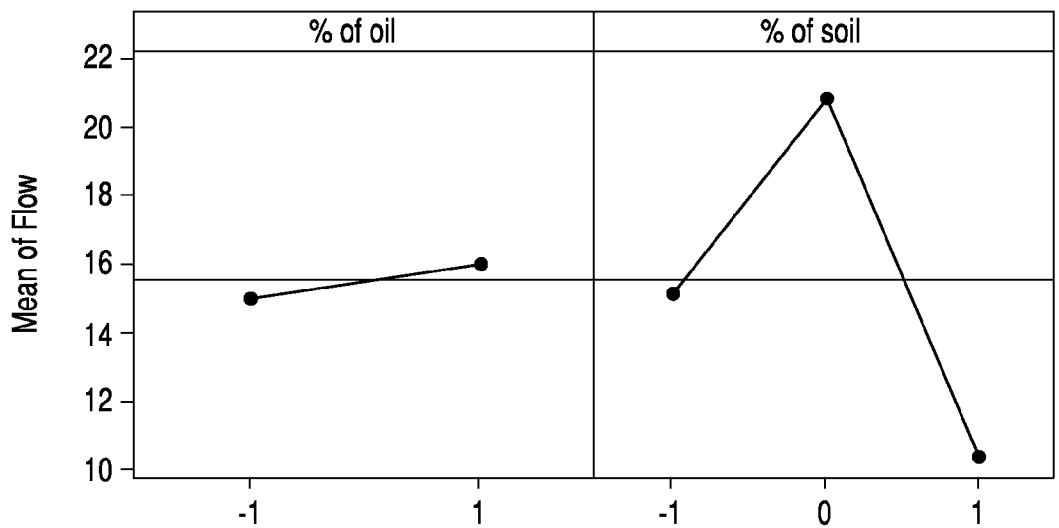
FIG. 3 graphical representation of the ANOVA main effect plot for flow.

From the main effect plot of flow FIG. 3, it is evadable that increasing the oil percentage from low to high increases the flow, and the high oil percentage has out of the range value. When moving from 30% to 40% the flow increases while it decreases from 40% to 50%, 40% yields value out of the acceptable range.

Figure 4:
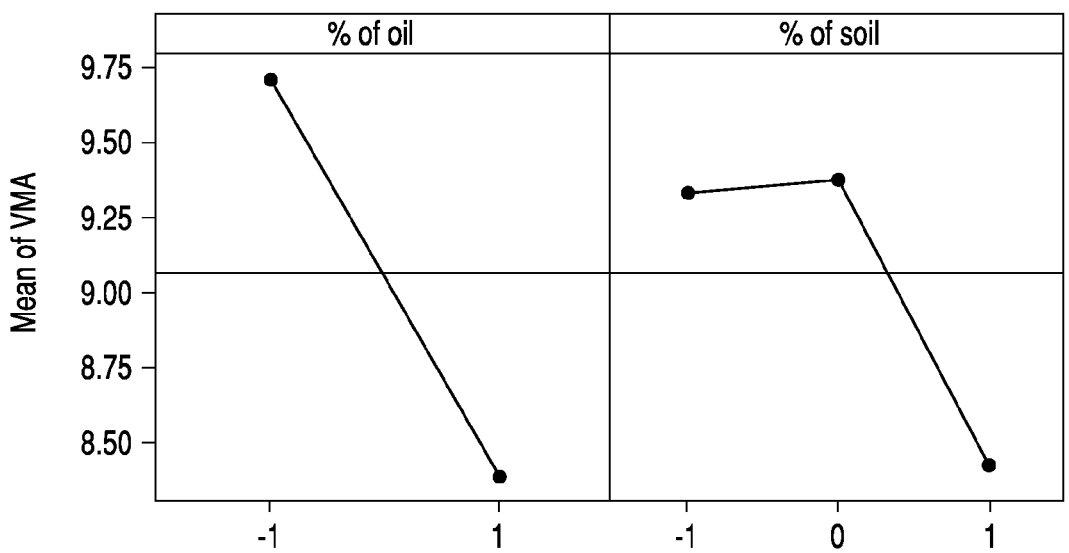
FIG. 4 is graphical representation of the ANOVA main effect plot for VMA.

The main effects plot of VMA in FIG. 4, indicates that increasing the percentage of oil from low to high decreases the VMA. It also indicates that moving the contaminated soil percentage from 30% to 40% increases the VMA while it decreases when moving the soil percentage from 40% to 50%.

E. The Interaction Effect

Interaction effect is important in showing the effect of the oil saturation percentage in the presence of different values of contaminated soil percentage and vice versa.

Figure 5A:
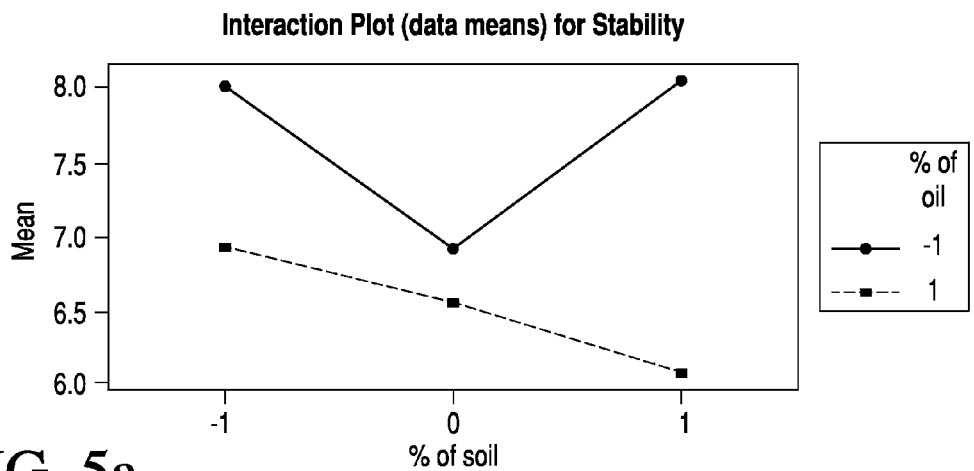
FIGS. 5*a*, 5*b* and 5*c* are graphical representations of ANOVA plots for stability, flow and VMA.
Figure 5B:
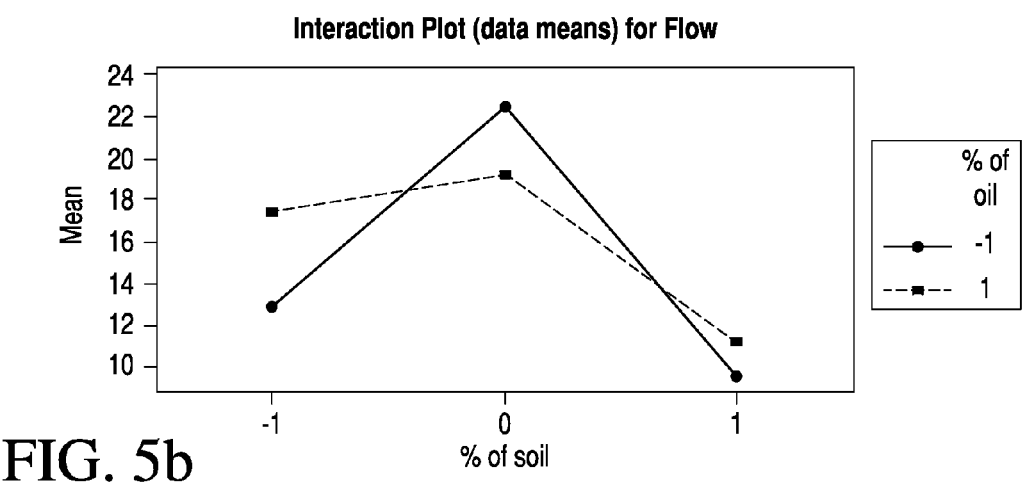
Figure 5C:
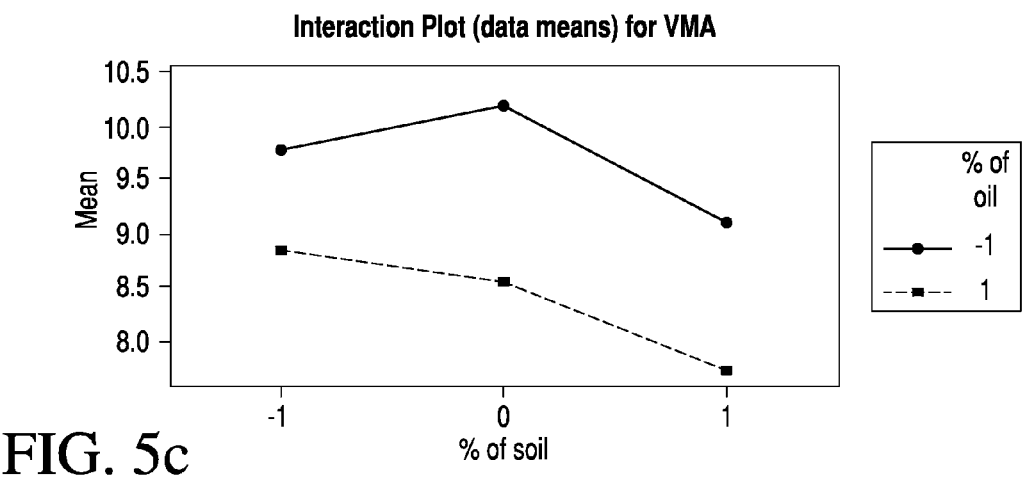

From interaction plots in FIG. 5 (*a*) and (*b*), the two lines are not parallel which means there must be an interaction between the oil saturation percentage and the soil contamination percentages. As for the VMA FIG. 5 (*c*), at high oil percentage, VMA is found to be less than VMA values of low oil percentage, regardless of amount of soil oil contamination.

F. Residual Analysis

Residual is an estimate of the experimental error. It represents the difference between observed and predicted values of the sample properties (stability, flow and VMA). Residual analysis is a model adequacy checking techniques by which the underlying ANOVA assumptions can be validated [4].

Figure 6:
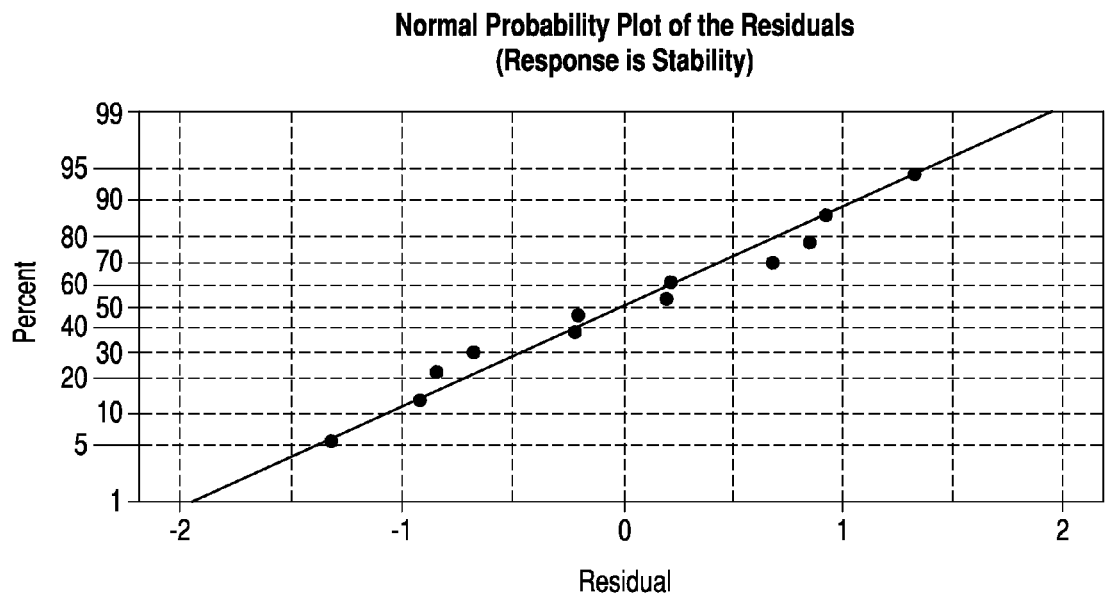
FIG. 6 is a graphical illustration of a normality plot of residuals.

From the Normal probability plot of residuals FIG. 6, the residuals points are either on or near the line, so the normality assumption is adequate.

Figure 7:
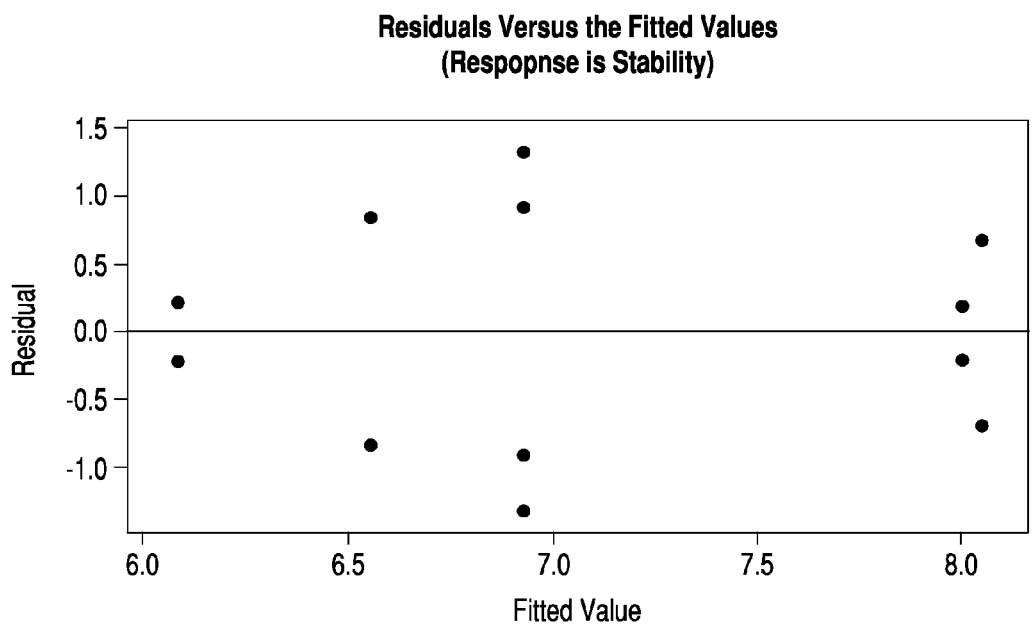
FIG. 7 is a graphical representation of the residual versus fitted indications.
Figure 8:
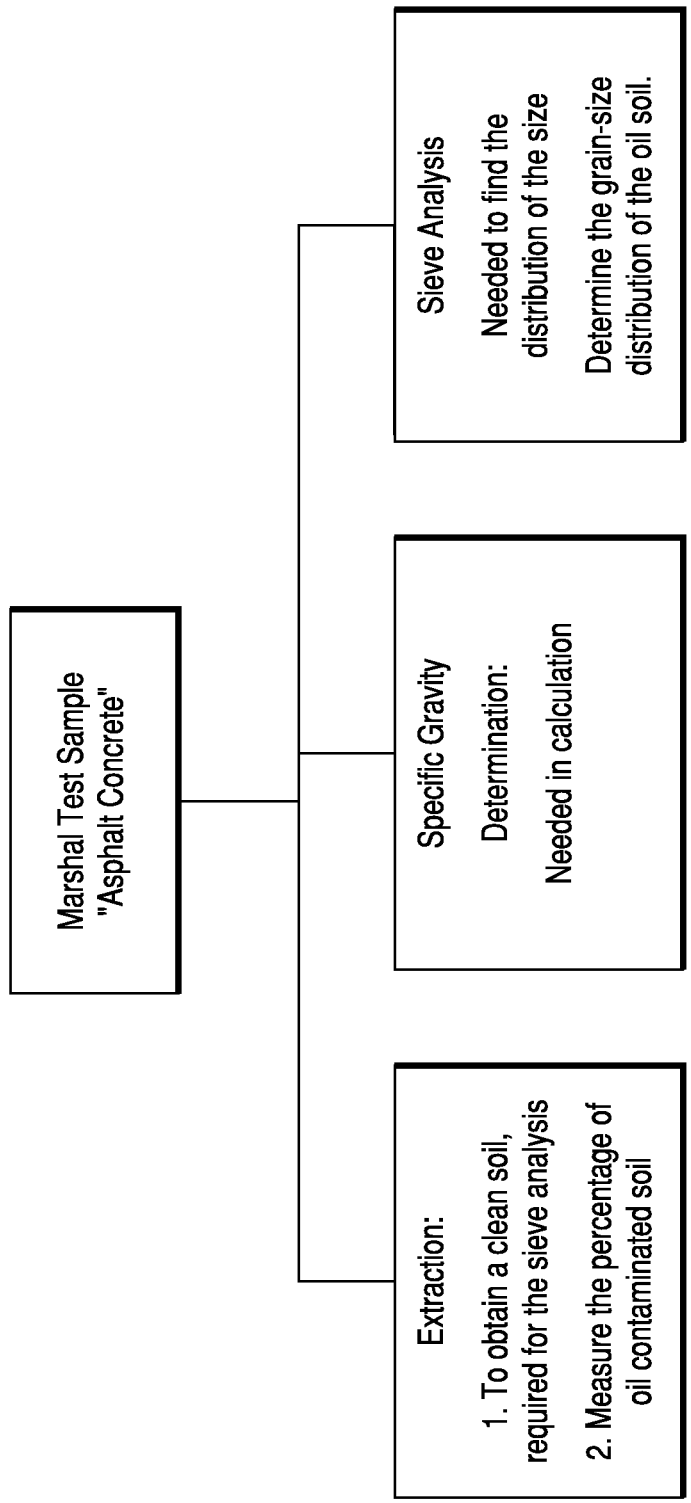
FIG. 8 is a block diagram of the work breakdown structure of a Marshal Test Sample for asphalt concrete.

The Residual versus fitted values graph in FIG. 7 is adequate. The difference between the highest and lowest residuals for each fitted value is similar except for the first fitted value this could be because of the small number of data taken.

VI. Conclusion

Soil stability values were acceptable when compared to standard values. In general, the resulted stability for low saturation yielded better values than high saturation level. The high oil saturation level with 30%, 40% and 50% were below the standard value in one replicate. As for the flow, values found were acceptable except for some outliers.

We can also conclude from our analysis that different levels of both contaminated soil percentage and the oil saturation percentage don't affect stability and flow, yet they affect the voids in the mineral aggregates.

In addition, some results were inconsistence between the two replicates. This might be due to different analyst abilities and difference in quality aggregate materials. This problem could be avoided when considered as blocks rather than replicates.

Future research is directed towards projecting the design into having a Marshal design with more coarse aggregate sand.

REFERENCES

[1] S. A. S. Omar, and N. R. Bhat, "Critical Assessment of the Environmental Consequences of the Invasion of Kuwait, the Gulf War, and the Aftermath". Kuwait, 2008.

[2] B. M. Das, "Soil Mechanics Laboratory Manual (6thed.)". New York: Oxford University Press, Inc, 2002.

[3] M. A. Ali, Marshall Method of Asphalt-Concrete Mix Design. Kuwait: Kuwait University, Civil Engineering Department, 2003.

[4] D. C. Montgomery, "Design and Analysis of Experiments (6thed.)". United State of America: Arizona State University, 2005.

While the invention has been described in connection with its preferred embodiments, it should be recognized that changes and modifications may be made therein without departing from the scope of the appended claims.

What is claimed is:

1. A method for testing, selecting and adding oil contaminated soil to asphalt for use in road construction, said method comprising the steps of:
   a. providing a mass of oil contaminated soil having a saturation of oil ranging between 2% and 4%, selecting a sample of said soil and demoisturizing said selected sample and cleaning said sample with hot toluene;
   b. conducting a sieve analysis by placing said sample in a shaker and determining the aggregate grain size of said oil contaminated soil;
   c. determining the specific gravity of said oil contaminated soil; and
   d. selecting the said oil contaminated soil as a partial replacement for aggregates in asphalt concrete and adding said oil contaminated soil to said asphalt and wherein between 30 and 50% of aggregate is replaced with said oil contaminated soil.

2. The method for testing, selecting and adding oil contaminated soil to asphalt for use in road construction according to claim 1 in which
said oil contaminated soil is demoisturized by heating at between 175° C. and 190° C. and cleaned with hot toluene and wherein said oil contaminated soil has a particle size of between 4.75 nm to less than 75 nm and saturation of oil ranging between 2% and 4%.

3. The method for testing, selecting and adding oil contaminated soil to asphalt for use in road construction according to claim 2 in which said selected sample is demoisturized at a temperature of between 175° C. and 190° C. for about 24 hours (time).

4. The method for testing, selecting and adding oil contaminated soil to asphalt for use in road construction according to claim 3 in which said oil contaminated soil is cleaned with hot toluene at a temperature of about 40° C.

5. The method for testing, selecting and adding oil contaminated soil to asphalt for use in road construction according to claim 4 in which said oil contaminated soil has a specific gravity of about 2.4 and 2.28.

6. The method for testing, selecting and adding oil contaminated soil to asphalt for use in road construction according to claim 5 in which said oil contaminated soil has a specific gravity of about 2.28 and said saturation of oil is about 4%.

7. The method for testing, selecting and adding oil contaminated soil to asphalt for use in road construction according to claim 5 in which said oil contaminated soil has a specific gravity of about 2.4 and said saturation of oil is about 2%.

8. The method for testing, selecting and adding oil contaminated soil to asphalt for use in road construction according to claim 5 in which said oil contaminated soil has a voids in mineral aggregates of between 8 and 10.4.

9. The method for testing, selecting and adding oil contaminated sand to asphalt for use in road construction, said method consisting of the following steps:
   a. providing a mass of oil contaminated sand having a saturation of oil ranging between 2% and 4%, selecting a sample of said oil contaminated sand and demoisturizing said selected sample by heating at 175° C. to 190° C. for about 24 hours;
   b. cleaning said demoisturized sample from step a with hot toluene under vigorous agitation after heating at 175° C. to 190° C. for 24 hours then cleaned at 40° C. for 30 minutes;
   c. subjecting the demoisturized and cleaned sample to a sieve analysis and determine that the mineral aggregate particles are between 4.5 mm and less than 75 µm; and
   d. selecting said oil contaminated soil as a partial replacement for aggregate in asphalt concrete and adding said oil contaminated soil to said asphalt and wherein between 30% and 50% of aggregate is replaced with said oil contaminated soil.

10. A method for recycling oil contaminated soil as a partial replacement for aggregate in asphalt concrete, said method consisting of:
   a. obtaining a mass of oil contaminated soil having a saturation of oil ranging between 2% and 4%, selecting a sample of said soil and demoisturizing said selected sample by heating at 175° C. to 190° C. and cleaning said selected sample with hot toluene at 40° C. for about 30 minutes;
   b. conducting a sieve analysis of said demoisturized and cleaned sample from step a to determine that the grain size of said demoisturized and cleaned sample is between 4.75 mm to about 75 mm and wherein the specific gravity is between 2.4 and 2.28;
   c. if the selected sample meets the criteria of step b, demoisturizing the mass of oil contaminated soil by heating at 175° C. and 190° C. for 24 hours and cleaning with hot toluene at a temperature of 40° C. for about 30 minutes; and
   d. selecting said oil contaminated soil as a partial replacement for aggregate in asphalt concrete and adding said oil contaminated soil to said asphalt and wherein between 30% and 50% of aggregate is replaced with said oil contaminated soil.

\* \* \* \* \*